(12) United States Patent
Terrill et al.

(10) Patent No.: US 8,117,091 B2
(45) Date of Patent: *Feb. 14, 2012

(54) SYSTEM AND METHOD FOR PROVIDING A CERTIFIED PHOTOGRAPH IN A NETWORK ENVIRONMENT

(75) Inventors: Chris S. Terrill, Dallas, TX (US); Todd W. Kirby, Dallas, TX (US)

(73) Assignee: MATCH.COM, L.L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,419

(22) Filed: Sep. 25, 2009

(65) Prior Publication Data

US 2010/0017469 A1 Jan. 21, 2010

Related U.S. Application Data

(63) Continuation of application No. 11/156,960, filed on Jun. 17, 2005, now Pat. No. 7,617,134.

(51) Int. Cl.
*G06Q 30/00* (2006.01)
(52) U.S. Cl. ...................... 705/27.1; 705/26.1
(58) Field of Classification Search ............... 705/26, 705/27
See application file for complete search history.

(56) References Cited

U.S. PATENT DOCUMENTS

| | | |
|---|---|---|
| 4,173,016 A | 10/1979 | Dickson |
| 4,789,907 A | 12/1988 | Fischetti et al. |
| 5,086,394 A | 2/1992 | Shapira |
| 5,164,897 A | 11/1992 | Clark et al. |
| 5,305,195 A | 4/1994 | Murphy |
| 5,606,361 A | 2/1997 | Davidsohn et al. |
| 5,623,660 A | 4/1997 | Josephson |
| 5,681,046 A | 10/1997 | Lawrence |
| 5,694,464 A | 12/1997 | Mashinsky |
| 5,696,981 A | 12/1997 | Shovers |
| 5,775,695 A | 7/1998 | Byers |
| 5,818,836 A | 10/1998 | DuVal |
| 5,832,432 A | 11/1998 | Trader et al. |
| 5,835,087 A | 11/1998 | Herz et al. |
| 5,850,428 A | 12/1998 | Day |
| 5,862,223 A | 1/1999 | Walker et al. |
| 5,884,270 A | 3/1999 | Walker et al. |
| 5,907,677 A | 5/1999 | Glenn et al. |
| 5,909,670 A | 6/1999 | Trader et al. |
| 5,950,200 A | 9/1999 | Sudai et al. |
| 5,956,716 A | 9/1999 | Kenner et al. |

(Continued)

FOREIGN PATENT DOCUMENTS

| | | |
|---|---|---|
| DE | 3508448 A1 | 3/1985 |
| EP | 0148406 B1 | 3/1989 |
| EP | 0649121 B1 | 1/2000 |
| WO | WO 2006/138585 | 12/2006 |

OTHER PUBLICATIONS

Factiva, "MicroVoice, InterStep offer personals," Seybold Report on Publishing Systems, vol. 25, No. 21, 2 pages, Jul. 29, 1997.

(Continued)

*Primary Examiner* — Robert M. Pond
(74) *Attorney, Agent, or Firm* — Patent Capital Group

(57) ABSTRACT

A method for providing a certified photograph in a network environment is offered that includes interfacing with one or more end users and managing information related to one or more of the end users. The method further includes displaying one or more photos of the end users and providing a label on the photos that certifies the photos as being substantially accurate.

18 Claims, 20 Drawing Sheets

U.S. PATENT DOCUMENTS

| | | |
|---|---|---|
| 5,963,951 A | 10/1999 | Collins |
| 5,996,006 A | 11/1999 | Speicher |
| 6,148,067 A | 11/2000 | Leipow |
| 6,181,867 B1 | 1/2001 | Kenner et al. |
| 6,185,532 B1 | 2/2001 | Lemaire et al. |
| 6,202,055 B1 | 3/2001 | Houvener et al. |
| 6,253,188 B1 | 6/2001 | Witek et al. |
| 6,272,467 B1 | 8/2001 | Durand et al. |
| 6,356,893 B1 | 3/2002 | Itakura et al. |
| 6,480,885 B1 | 11/2002 | Olivier |
| 6,564,213 B1 | 5/2003 | Ortega et al. |
| 6,633,885 B1 | 10/2003 | Agrawal et al. |
| 6,643,681 B1 | 11/2003 | Saito et al. |
| 6,647,355 B2 | 11/2003 | Heinberg et al. |
| 6,658,391 B1 | 12/2003 | Williams et al. |
| 6,735,568 B1 | 5/2004 | Buckwalter et al. |
| 6,775,775 B1 | 8/2004 | Yoshiura et al. |
| 6,857,024 B1 | 2/2005 | Chen et al. |
| 6,868,160 B1 | 3/2005 | Raji |
| 6,873,693 B1 | 3/2005 | Langseth et al. |
| 7,043,443 B1 | 5/2006 | Firestone |
| 7,069,308 B2 | 6/2006 | Abrams |
| 7,085,806 B1 | 8/2006 | Shapira |
| 7,092,952 B1 | 8/2006 | Wilens |
| 7,117,254 B2 | 10/2006 | Lunt et al. |
| 7,188,153 B2 | 3/2007 | Lunt et al. |
| 7,203,674 B2 | 4/2007 | Cohen |
| 7,246,067 B2 | 7/2007 | Austin et al. |
| 7,254,406 B2 | 8/2007 | Beros et al. |
| 7,264,474 B2 | 9/2007 | Sullivan et al. |
| 7,277,888 B2 | 10/2007 | Gelormine et al. |
| 7,342,503 B1 | 3/2008 | Light et al. |
| 7,394,388 B1 | 7/2008 | Light et al. |
| 7,401,098 B2 | 7/2008 | Baker |
| 7,613,706 B2 | 11/2009 | Terrill et al. |
| 7,676,466 B2 | 3/2010 | Terrill et al. |
| 8,010,546 B2 | 8/2011 | Terrill et al. |
| 8,010,556 B2 | 8/2011 | Terrill et al. |
| 8,051,013 B2 | 11/2011 | Terrill et al. |
| 2001/0031454 A1 | 10/2001 | Mintz |
| 2001/0048449 A1 | 12/2001 | Baker |
| 2002/0045154 A1 | 4/2002 | Wood et al. |
| 2002/0059369 A1 | 5/2002 | Kern et al. |
| 2002/0091556 A1 | 7/2002 | Fiala et al. |
| 2002/0178057 A1 | 11/2002 | Bertram et al. |
| 2003/0078976 A1 | 4/2003 | Gordon |
| 2003/0088554 A1 | 5/2003 | Ryan et al. |
| 2003/0191673 A1 | 10/2003 | Cohen |
| 2004/0093334 A1 | 5/2004 | Scherer |
| 2004/0128148 A1 | 7/2004 | Austin et al. |
| 2004/0167794 A1 | 8/2004 | Shostack et al. |
| 2004/0210661 A1 | 10/2004 | Thompson |
| 2004/0249811 A1 | 12/2004 | Shostack et al. |
| 2004/0260781 A1 | 12/2004 | Shostack et al. |
| 2005/0038876 A1 | 2/2005 | Chaudhuri |
| 2005/0060183 A1 | 3/2005 | Haupt |
| 2005/0153678 A1 | 7/2005 | Tiberi |
| 2005/0177528 A1* | 8/2005 | Qamar .................. 705/404 |
| 2005/0235062 A1 | 10/2005 | Lunt |
| 2006/0041401 A1 | 2/2006 | Johnston |
| 2006/0059130 A1 | 3/2006 | Weiss et al. |
| 2006/0059142 A1 | 3/2006 | Zvinyatskovsky et al. |
| 2006/0059147 A1 | 3/2006 | Weiss et al. |
| 2006/0059159 A1 | 3/2006 | Truong et al. |
| 2006/0106667 A1 | 5/2006 | Coyne |
| 2006/0121426 A1 | 6/2006 | Scoresby et al. |
| 2006/0126095 A1* | 6/2006 | Tamura et al. ............ 358/1.14 |
| 2006/0136498 A1 | 6/2006 | Insley |
| 2006/0149625 A1 | 7/2006 | Koningstein |
| 2006/0179111 A1 | 8/2006 | Verona |
| 2006/0287928 A1 | 12/2006 | Terrill et al. |
| 2007/0005750 A1 | 1/2007 | Lunt et al. |
| 2007/0030824 A1 | 2/2007 | Ribaudo et al. |
| 2007/0031800 A1 | 2/2007 | Solomon |
| 2007/0032240 A1 | 2/2007 | Finnegan et al. |
| 2007/0050354 A1 | 3/2007 | Rosenberg |
| 2007/0069901 A1 | 3/2007 | Tuck et al. |
| 2007/0072468 A1 | 3/2007 | Terrill et al. |
| 2007/0073548 A1 | 3/2007 | Terrill et al. |
| 2007/0073549 A1 | 3/2007 | Terrill et al. |
| 2007/0073687 A1 | 3/2007 | Terrill et al. |
| 2007/0073710 A1 | 3/2007 | Terrill et al. |
| 2007/0073711 A1 | 3/2007 | Terrill et al. |
| 2007/0073802 A1 | 3/2007 | Terrill et al. |
| 2007/0073803 A1 | 3/2007 | Terrill et al. |
| 2007/0112762 A1 | 5/2007 | Brubaker |
| 2007/0162458 A1 | 7/2007 | Fasciano |
| 2007/0233730 A1 | 10/2007 | Johnston |
| 2008/0059217 A1 | 3/2008 | Austin et al. |
| 2008/0222535 A1 | 9/2008 | Zrike et al. |
| 2008/0301557 A1 | 12/2008 | Kotlyar |
| 2009/0070133 A1 | 3/2009 | Bonilla et al. |
| 2010/0017375 A1 | 1/2010 | Terrill et al. |
| 2010/0077032 A1 | 3/2010 | Drennan et al. |
| 2010/0125530 A1 | 5/2010 | Terrill et al. |

OTHER PUBLICATIONS

Factiva, "IBM Teams with Electric Classifieds," Seybold Report on Publishing Systems, vol. 25, No. 21, 1 page, Jul. 29, 1996.

Neil Marks, "Home Alone and Wired for Romance," The Mail on Sunday, 1 page, May 19, 1996.

Mitch Ratcliffe, Write once, publish many times: Electric Classifieds Inc.'s flexible publishing technology (middleware for online publishing), Digital Media, vol. 5, No. 3, ISSN: 1056-7038, 4 pages, Aug. 7, 1995.

Factiva, "Desktop Video: VDOLive Will Enable Motion Video on the Internet; Conquers Internet's Technical Challenges & Will Make Desktop Video Broadcasting Applications Possible," Edge, 2 pages, Nov. 6, 1995.

Factiva, "Electronic Classifieds: U S West Marketing Resources Teams with Denver's Rocky Mountain News," Edge, vol. 9, No. 323, ISSN: 0890-9563, 2 pages, Oct. 3, 1994.

Ric Manning, "Singles Use Newest Approach: Multimedia," Louisville Courier-Journal, 2 pages, May 3, 1994.

Factiva, "Nexpo '96 Preview: Something for Everyone in Las Vegas, part 6," Seybold Report on Publishing Systems, vol. 25, No. 17, 3 pages, May 31, 1996.

Marco R. Della Cava, "Truth in advertising hits Internet dating; Services help potential mates spot scammers," USA Today, ProQuest #62115951, 6 pages, Apr. 20, 2004.

LookBetterOnline: Internet Archive Wayback Machine; www.archive.org; collection of web pages from http://lookbetteronline.com, 23 pages, May 19, 2004, Jun. 14, 2004.

Baker, Frank, "Anthropological Notes on the Human Hand," American Anthropologist, vol. A1, Issue 1, Jan. 1888 (pp. 51-76).

Notification of Transmittal of the International Search Report and the Written Opinion of the International Search Authority, or the Declaration (3 pages); Written Opinion of the International Searching Authority (5 pages), and International Search Report (4 pages) for International Application No. PCT/US 06/23518 mailed May 21, 2008.

Microsoft, "Immedient Improves and Streamlines Hiring with Microsoft Office Solution Accelerator for Recruiting," Published Sep. 2003, 4 pages.

Drogehorn et al., Personalised applications and services for a mobile user, Apr. 4-8, 2005, IEEE, 473-479 (7 pages).

Chen Zhou et al., DAML-QoS ontology for Web services, Jul. 6-9, 2004, IEEE 472-479 (8 pages).

Supjarerndee et al., Recruitment filtering with personality-job fit model, Apr. 8-10, 2002, IEEE, 6 pages.

Wilson et al., Design guidelines for parallel algorithms using continuous job profiles, Apr. 30-May 2, 1991, IEEE, pp. 30-36.

Foner, L., "A Multi-Agent Referral System for Matchmaking," MIT Media Lab, 1996, (8 pages).

Frodi, et al., "Fathers' and Mothers' Responses to Infant Smiles and Cries," Infant Behavior and Development, vol. 1, Jan. 1978 (pp. 187-198).

Zitzmann et al., "Testosterone Levels in Healthy Men and the Relation to Behavioural and Physical Characteristics: Facts and Constructs," European Journal of Endocrinology 144 (2001) (pp. 183-197).

* cited by examiner

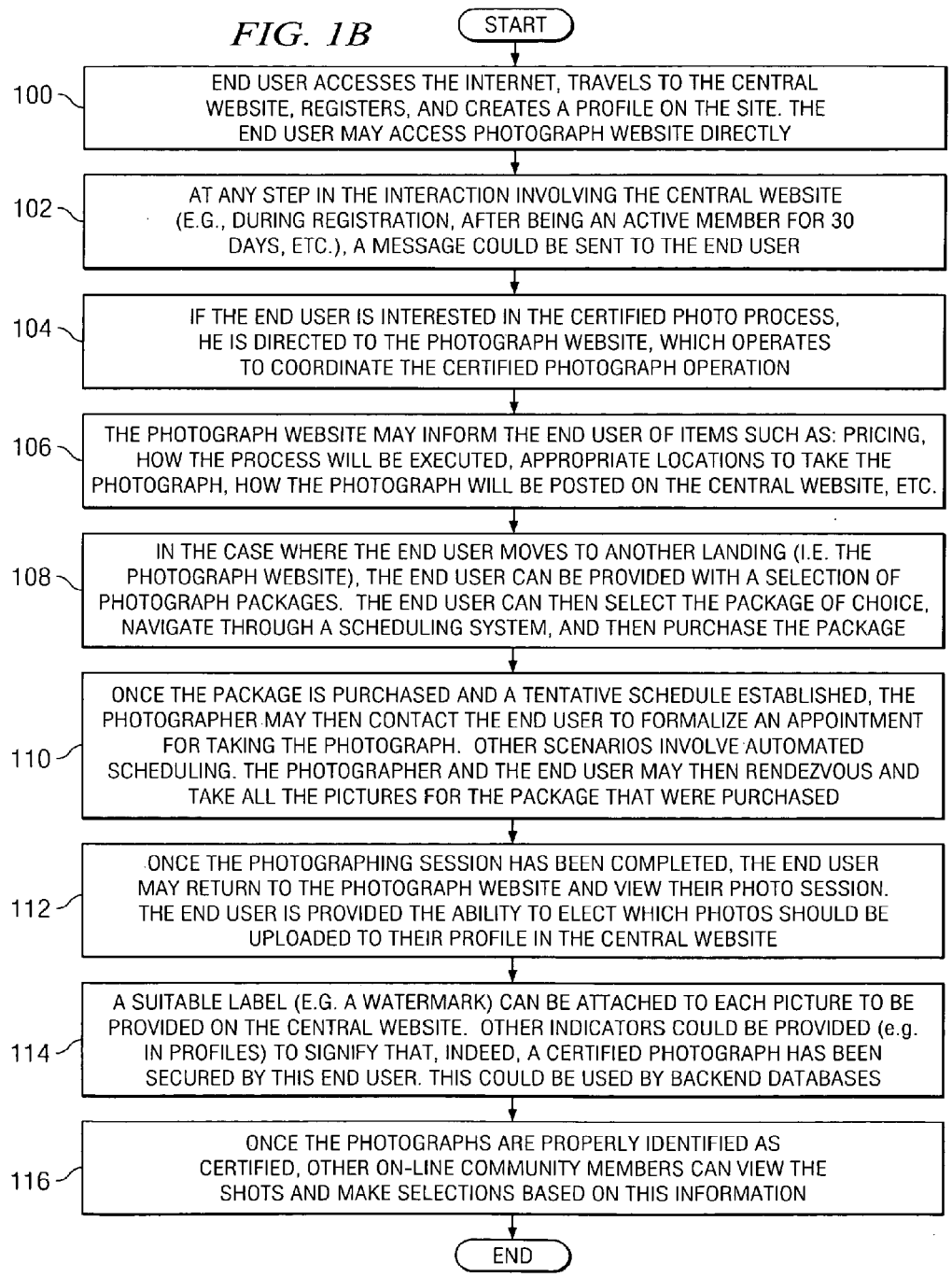

FIG. 2C

FIG. 2E match.com®   My Match | Search | My Profile | Email | Advice:
Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [          ]
Choose a password: [          ]
Your email address: [          ]
I am a:          ○ Man   ○ Woman
Seeking:         ○ Man   ○ Woman
Between ages:    [25 ▼] and [33 ▼]
Your birthday:   [Month ▼] [Day ▼] [Year ▼]
Your country:    [United States ▼]
Zip / postal code: [          ]
Where did you hear about Match.com:  [Choose below ▼] (Optional)

☑ Send me photos of my compatible matches. By checking this box, I also consent to receive from Match.com special offers and promotions relating to Match.com and select third parties, as well as tips and announcements on how I can better use the Match.com service.

☐ Send me special offers and partner promotions. Receive exclusive deals and timely updates sent to you by select Match.com partners.

I am at least 18 years old and have read and agree to Match.com's terms of use and privacy policy.

[Continue ▷]

FIG. 2F match.com®  close window

LadyDi520

Active within 24 hours    New

Basics

"Looking for my Knight is Shining Armor"

| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

About me and who I'd like to meet

I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!

Appearance

| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests for fun:

I love to have a good time at whatever I am doing. I love to laugh I love to smile and I am looking for that someone that can make that happen, it hasn't for a LONG time.

FROM FIG. 2F favorite hot spots:
I love Olive Garden (cheap date) LOL then karokee, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I use to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer | pets:

| | |
|---|---|
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2G

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun<br>Boot scootin' across gritty floorboards, the band playing what we'll soon remember as "our song" |
| Photos | |

| match.com® certified photos | Home  FAQs  Contact Us         Call Toll Free: 1-866-359-7656 |
| | Learn More | Schedule Session | Certified Photo Examples |
| | sign-in | benefits | certification info |

A Match.com Professional Photographer is available in your area!

Your Progress [1] [2] [3] [4] [5]

Please select whether you would like a studio or location photographer.

Step 1 - Choose your Session Type

| I would like a studio photographer | I would like a location photographer |
|---|---|
| Experience the fun of professional photo shoot in the comfort of a photographer's studio. | Enjoy you photo shoot at the location of your choice - indoor or outdoor! |
| [Select] | [Select] |

Note: A $15 charge will be applied to the final price of all location shoots.

Learn More about the photographers who will be shooting your photo session

FIG. 3E match.com certified photos

Home | FAQs | Contact Us | Call Toll Free: 1-866-359-7656

Learn More | Schedule Session | Certified Photo Examples sign-in | benefits | certification info Your Progress [1] [2] [3] [4] [5]

Step 3 - Choose Available Times

Schedule Session: tell us when your are available

Please select ALL times your are potentially available for your photo session. Once satisfied, click "Continue" to proceed to the next step.

Note! At completion of purchase, your photographer will contact you to schedule a photo session based on your selections

|  | | Morning | | Lunch Hour | Afternoon/Evening | |
|---|---|---|---|---|---|---|
|  | Anytime | 7-9 AM | 9-12 AM | 12-2 PM | 2-5 PM | 5-7 PM |
| Monday | ☐ | ☑ | ☐ | ☐ | ☐ | ☐ |
| Tuesday | ☐ | ☐ | ☐ | ☐ | ☐ | ☐ |
| Wednesday | ☐ | ☐ | ☐ | ☐ | ☐ | ☐ |
| Thursday | ☐ | ☐ | ☐ | ☐ | ☐ | ☐ |
| Friday | ☐ | ☐ | ☐ | ☐ | ☐ | ☐ |
| Saturday | ☐ | ☐ | ☐ | ☐ | ☐ | ☐ |
| Sunday | ☐ | ☐ | ☐ | ☐ | ☐ | ☐ |

Special Scheduling Requests?

| match.com® certified photos | Home  FAQs  Contact Us     Call Toll Free: 1-866-359-7656 |
|---|---|
| | Learn More \| Schedule Session \| Certified Photo Examples |
| | sign-in \| benefits \| certification info |

Schedule Session: personal information

Please enter your personal information
in the fields below and click "Continue."

Your Progress [1] [2] [3] [4] [5]

Step 4 - Billing (Enter Personal Information)

\* denotes required fields

Name/Email:

- \*First Name: [ Test ]
- \*Last Name: [ This is a test ]
- \*Email: [ thomas.smith@abcxzy.com ]
- \*Confirm Email: [ thomas.smith@abcxzy.com ]

Optional Information:

Do you have a Match.com username? If so, enter it here. <u>Questions?</u>

Match.com Username [ test ]

<u>Don't have a Match.com Username or forgot?</u>

Billing Address:

- \*Billing Address: [ test ]
- Billing Address2: [ test ]
- \*City: [ dallas ]
- \*State or Province: [ Texas ▼ ]
- \*Zip: [ 75201 ]
- \*Phone: [ 214-532-0000 ]
- \*Country: [ United States ▼ ]

\* [✓] I agree to the <u>Terms and Conditions</u>

| match.com® certified photos | Home  FAQs  Contact Us      Call Toll Free: 1-866-359-7656 |
|---|---|
| | Learn More \| Schedule Session \| Certified Photo Examples |
| | sign-in \| benefits \| certification info |

Schedule Session: review order

Please review the details of your Match.com Certified Photo order. Once satisfied, click "Continue" to proceed to billing.

Your Progress [1] [2] [3] [4] [5]

Step 5 - Billing (Review Order)

Selected Session Package:

| Package | Quantity | Price |
|---|---|---|
| Premium Choice Package | 1 | $149.95 |
| Location: I'd like to go to the Photographer | | $0.00 |
| | Subtotal: | $149.95 |
| | Tax: | $12.37 |
| | Total: | $162.32 |

Change Location / Change Package

Selected Availability:

| Monday: | 7-9 AM |
|---|---|
| Scheduling Requests: | |

Change Availability

Selected Photographer:

| Name: | Todd Kirby |
|---|---|
| Distance: | 0 miles |
| Contact: | This Match.com Certified Photographer will contact you within 48 hours to schedule your appointment. |

Personal Information:

| UserName: | test |
|---|---|
| Name: | Test This is a test |
| Phone: | 214-953-0000 |
| Email: | thomas.smith@abcxyz.com |
| Address: | test<br>test |
| City: | dallas |
| State/Province: | TX |
| Postal Code: | 75201 |

SYSTEM AND METHOD FOR PROVIDING A CERTIFIED PHOTOGRAPH IN A NETWORK ENVIRONMENT

RELATED APPLICATION

This patent application is a continuation of, and claims the benefit of priority under 35 U.S.C. §120 of U.S. application Ser. No. 11/156,960, filed Jun. 17, 2005 now U.S. Pat. No. 7,617,134, entitled SYSTEM AND METHOD FOR PROVIDING A CERTIFIED PHOTOGRAPH IN A NETWORK ENVIRONMENT, which is expressly incorporated herein by reference in its entirety.

TECHNICAL FIELD OF THE INVENTION

This invention relates in general to the field of communications and, more particularly, to a system and a method for providing a certified photograph in a network environment.

BACKGROUND OF THE INVENTION

Networking architectures have grown increasingly complex in communications environments. In recent years, a series of protocols and architectures have been developed in order to accommodate a diverse group of end users having various networking needs. Many of these architectures have gained significant notoriety because they can offer the benefits of automation, convenience, management, and enhanced consumer selections.

For example, certain protocols may be used in order to allow an end user to conduct an on-line search of candidates to fill a given vacancy. These protocols may relate to job searches, person finding services, real estate searches, or on-line dating. Where a photograph is provided in conjunction with these operations, one pervading issue has surfaced. Many users, whether having benign or mendacious intentions, provide photographs that lack authenticity. If another user in the system relies on such an inaccurate image, then he/she is mislead about the individual. This wastes time for a given user and militates frustration for those who rely on this flawed data. In some instances, the proffered photo may be dated, blurry, or lacking in focus on the targeted individual (i.e. in a large group shot). Such scenarios are problematic for both the individual who is inadequately captured in the photo and for the audience who will be reviewing the substandard picture.

Accordingly, the ability to provide an effective mechanism to properly offer photographs to an on-line community offers a significant challenge to web site operators, component manufacturers, and system designers.

SUMMARY OF THE INVENTION

From the foregoing, it may be appreciated by those skilled in the art that a need has arisen for an improved communications platform that provides for more accurate photographs in offering optimal networking services and capabilities to an end user. In accordance with one embodiment of the present invention, a system and a method for providing a certified photo in a network environment are provided that greatly reduce disadvantages and problems associated with conventional photograph management techniques.

According to one embodiment of the present invention, a method for offering a certified photograph in a network environment is provided that includes interfacing with one or more end users and managing information related to one or more of the end users. The method further includes displaying one or more photos of the end users and providing a label on the photos that certifies the photos as being substantially accurate.

In more particular embodiments, the method can include configuring a central web site to facilitate an on-line dating operation such that one or more of the end users are capable of interacting in order to find candidates that match their interests.

In still other embodiments, the method can include directing the end users to a photographer, who is responsible for taking the photos. In addition, a photograph web site may be used in offering pricing and scheduling information for the photos. In some scenarios, a link is provided from a central web site to a photograph web site, which is operable to manage the photos. The photograph web site can offer one or more photograph packages from which one or more of the end users may select.

Certain embodiments of the present invention may provide a number of technical advantages. For example, according to one embodiment of the present invention, a service approach is provided that allows a given end user to be depicted accurately on a web site, where appearance is a factor in their potential interaction with other members of the on-line community. This benefit is symbiotic in that the end user may receive increased attention from other members, while the audience is offered an accurate portrayal of this particular end user.

Another advantage of the present invention is that the end user is provided with a high-quality photograph that can only enhance their success on the web site. Additionally, by offering such a photograph, numerous undesirable characteristics associated with amateur photography (e.g. blurred pictures, red-eye issues, lack of emphasis on the end user [i.e. in large group shots], etc.) are effectively avoided. Other negative scenarios that operate to obscure the true appearance of a given end user include: digital imaging, lighting manipulation, "Glamour Shots" in which an inordinate amount of make up is employed, or reconstructive photography (where objects are edited and then repositioned in a photograph).

Yet another advantage of the present invention relates to the certification label, which informs others of the authenticity of the photograph. This could be provided via a watermark or via any other suitable moniker that indicates a reliability metric for the photograph. The certification can also indicate the date that the photograph was taken. Note that dated photographs often belie the actual appearance of a participant of the web site. Consider a case where a high school photo is proffered for an end user who is in their 30's. Although the end user's intentions may not be deceptive, such a photograph is simply misleading, as it fails to provide relevant information to the target audience. The present invention overcomes such deficiencies in offering an optimal photograph, which is both current and realistic Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1B is a flowchart illustrating a series of example steps associated with a method for providing a certified photograph in accordance with one embodiment of the present invention;

FIGS. 2A-2H are simplified screen shots of an example protocol for participating in an on-line service, which may utilize a photograph;

FIGS. 3A-G are simplified screen shots of an example protocol for initiating and securing a certified photograph in accordance with one example implementation.

DETAILED DESCRIPTION OF EXAMPLE EMBODIMENTS OF THE INVENTION

Figure 1A:
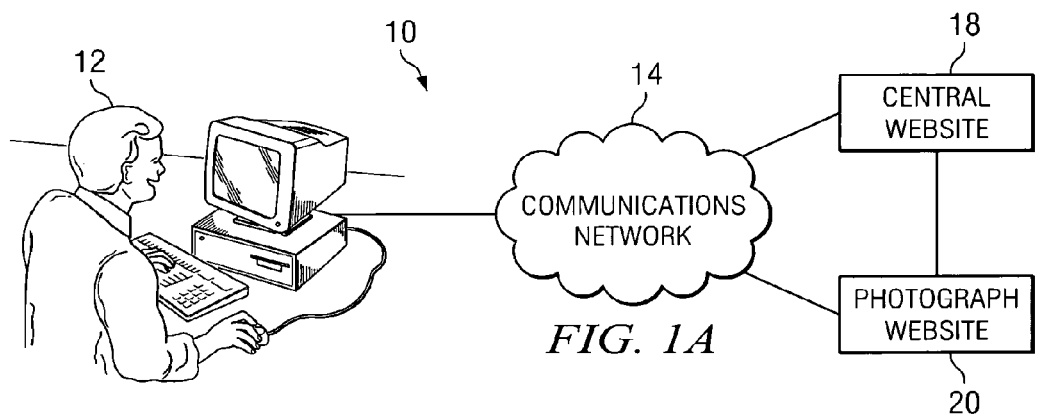
FIG. 1A is a simplified block diagram of a system for providing a certified photograph in accordance with one embodiment of the present invention.

FIG. 1A is a simplified block diagram of a system 10 for facilitating a certified photograph protocol. FIG. 1A includes an end user 12, a communications network 14, a central web site 18, and a photograph web site 20. FIG. 1A may be configured such that inter and intra-communications are readily achieved by any of the components included therein.

End users 12 are clients, customers, prospective customers, or entities wishing to view information associated with other participants in the system. End users 12 may also seek to access or to initiate a communication with other users that may be delivered via communications network 14. End users 12 may review data (such as profiles for example) associated with other users in order to make matching decisions or elections. Data, as used herein in this document, refers to any type of numeric, voice, video, or script data, or any other suitable information in any appropriate format that may be communicated from one point to another.

In one embodiment, end user 12 represents (and is inclusive of) a personal computer that may be used to access the Internet. Alternatively, end user 12, as illustrated in FIG. 1A, may be representative of a cellular telephone, an electronic notebook, a laptop, a personal digital assistant (PDA), or any other suitable device (wireless or otherwise: some of which can perform web browsing), component, or element capable of accessing one or more elements within system 10. An end user interface, which may be provided in conjunction with the items listed above, may further comprise any suitable interface for a human user such as a display, a video camera, a microphone, a keyboard, a mouse, or any other appropriate terminal equipment according to particular configurations and arrangements. In addition, the end user interface may be a unique element designed specifically for communications involving system 10. Such an element may be fabricated or produced specifically for matching applications involving end user 12.

Communications network 14 is a communicative platform operable to exchange data or information emanating from end user 12. Communications network 14 represents an Internet architecture in a particular embodiment of the present invention, which provides end user 12 with the ability to electronically execute or to initiate actions associated with finding a potential candidate, who satisfies a given query. Alternatively, communications network 14 could be a plain old telephone system (POTS), which end user 12 could use to perform the same operations or functions. Such transactions may be assisted by management associated with central web site 18 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Central web site 18 is a server (in one embodiment) that is operable to receive and to communicate information to end user 12. Alternatively, central web site 18 may be any switch, router, gateway, processor, component, object or element operable to facilitate communications involving end user 12. In one particular embodiment, central web site 18 is engaged in facilitating interaction between parties interested in seeking a romantic partner (i.e. on-line dating). For example, central web site 18 can be on-line dating service provider www.Match.com. In other embodiments, central web site 18 is any web site or architecture interested in facilitating a connection involving two or more people, and which may make use of a given photograph. This could include services associated with job placements, escort services, real estate, recruiting services (e.g. in athletics or in academic settings), etc.

Photograph web site 20 is a server (in one embodiment) that is operable to receive and to communicate information to end user 12. Alternatively, photograph web site 20 may be any switch, router, gateway, processor, component, object or element operable to facilitate communications involving end user 12. In one particular embodiment, photograph web site 20 is operable to coordinate scheduling, uploading, packaging, and pricing information associated with photographs to be displayed on a given web site. For example, in a particular embodiment, photograph web site 20 could be on-line photograph service provider www.Matchphotos.com, which is operated or controlled by www.Match.com. In other embodiments, photograph web site 20 is any web site or architecture interested in managing a photograph to be taken for an individual or group.

A link may be provided on either central web site 18 or photograph web site 20 (or on both) such that a given end user can be immediately directed to the other site. While one embodiment offers a connection between these two sites, these two sites may be completely independent of each other in other embodiments, where independent entities operate these sites. In the case that these two sites are operable to communicate with each other, a secure connection can be provided in order to maintain the integrity of the information propagating between the sites and to protect the privacy of the individuals implicated by the communications.

With regard to the specific items that effectuate the teachings of the present invention, each of central web site 18 and photograph web site 20 may include software and/or algorithms to achieve the operations for delivering, uploading, maintaining, and/or generally managing a certified photograph, as described herein. This includes suitably displaying some or all of these items. Alternatively, such photography operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of central web site 18 and photograph web site 20 in the context of system 10. Thus, it can be easily appreciated that such functions could be provided external to central web site 18 and photograph web site 20. In such cases, such a functionality could be readily embodied in a separate component, server, processor, device, or module. Note that these photography features and capabilities may be provided in just one of these elements, in both, or distributed across both of them. Hence, in certain embodiments, the certified photograph operations may be consolidated in a single web site, where no redirection is needed, nor performed for the user.

In operation of an example flow, as is illustrated by FIG. 1B, consider a case where a given end user is interested in participating in an on-line dating scenario. End user 12 can access the Internet, travel to central web site 18, register, and create a profile on the site. This is illustrated by step 100. Note that end user 12 may access photograph web site 20 directly as well. Moreover, end user 12 can access either web site through any suitable banner, pop-up, partnership, e-mail solicitations, direct mailings, etc. It can be appreciated that on-line commerce can be generated by a plethora of marketing tools and any such tools can readily cooperate with the operations of the present invention.

From step 100, matching (of any form) can commence amongst the on-line community. For example, in the context of a romantic endeavor, a person may begin the dating process or engage in communications that would spawn such dating. Other applications could include job applicants who are being sought by employers. Note that appearance may be a highly relevant factor in certain hiring decisions (e.g. modeling, acting, etc.). However, a certified photograph can still prove useful and convenient for employers who care to review a photograph, but who may not necessarily make the hiring decision based on physical looks. The certified photograph feature offered by the present invention can be implemented in conjunction with any suitable architecture where a photograph could be utilized by a given person. (Note the certified photograph may be referred to as a "Certipic" or "Certi-pic" both of which are Trademarks of Match.com L.P.)

At any step in the interaction involving central web site 18 (e.g. during registration, after being an active member for 30 days, etc.), a message could be sent to end user 12. This is illustrated at step 102. The message (e.g. an e-mail message) could be a solicitation for the certified photo feature and, further, would include details concerning a potential certified photograph to be used in conjunction with the end user's profile. In other scenarios, end user 12 could be introduced to such an idea through a web site banner, a pop-up window, by viewing of a certified photograph from another end user, or any other appropriate indicator.

If end user 12 is interested in the certified photograph process, then a series of process flows may be explored via a link on central web site 18. (Note that details relating to these process flows are provided below with reference to corresponding FIGURES, which offer example screen shots associated with each step in the process.) In one non-limiting embodiment, if end user 12 is interested in the certified photo process, he is directed to photograph web site 20, which operates to coordinate the certified photograph procedure. This is illustrated by step 104.

Photograph web site 20 may inform end user 12 of items such as: pricing, how the process will be conducted, appropriate locations to take the photograph, how the photograph will be posted on central web site 20, etc. This is illustrated by step 106. In other embodiments, there is no link on central web site 18 for the certified photograph process and photograph web site 20 is accessed directly by interested participants. In still other embodiments, coordination of the certified photograph process can be achieved through e-mail communications, via the telephone, etc.

In the case where end user 12 moves to another landing (i.e. photograph web site 20), end user 12 can be provided with a selection of photograph packages. End user 12 can then select the package of choice, navigate through a scheduling system, and then purchase the package. This is illustrated by step 108. End user 12 also has the option of selecting a location photographer, a studio photographer, an action shot photographer, or any other type of professional who can take the requisite shots. Once the package is purchased and a tentative schedule established, the photographer may then contact end user 12 to formalize and confirm an appointment for taking the photograph. The photographer and end user 12 may then rendezvous and take all the pictures for the package that was purchased. This is illustrated by step 110.

Note that other scenarios may involve automated scheduling, where a scheduler is linked to one or more photographers. Hence, an internal scheduler of the photographer could be utilized to synchronize appropriate times for the photo shoot. This internal scheduler could further optimize the appointment process. The photographer may make a final phone call to confirm the appointment or to see if any questions from the customer need to be answered.

In one embodiment, the photographer is directed by representatives from central web site 18. In this manner, operators of central web site 18 can assert some quality control in the process. For example, the photographer may be instructed to take 'realistic' head shots of end user 12 that accurately represent the individual. With respect to verifying the identity of end user 12, the photographer may ask to see a driver's license (or some other form of identification) before proceeding with the photo session.

Additionally, the photographs may be shot such that they can be placed directly into the format provided by central web site 18. Hence, cropping considerations may be properly accounted for. The goal of the photographer is two-fold: 1) to offer a truthful representation of end user 12 to other users of central web site 18; and 2) to optimize the photos themselves such that they can be readily integrated into a profile contained within central web site 18.

Once the photograph session has been completed, end user 12 may return to photograph web site 20 and view their photo session. The proofs may include two categories: 1) body shots; and 2) head shots. At step 112, end user 12 is provided with the ability to elect which photos should be uploaded to their profile in central web site 18. In addition, end user 12 may also designate which head shot should be uploaded and provided automatically as the primary photograph in their profile. Note that end user 12 could easily designate several photographs (or even all of the photographs taken) to be provided along with their profile. In a matter of minutes, all of the chosen photographs may be uploaded and then prominently displayed on the web site.

At step 114, a suitable label (e.g. a watermark) can be attached to each picture, which is to be provided on central web site 18. This item offers a proverbial stamp of approval or certification of authenticity for the photos. In one example, the watermark states the organization that is certifying the photo (e.g. Match.com) and the date on which the photo was certified. [Note that the watermark can be removed by end user 12 in the case where end user 12 would like to print some of the photos for personal use. Note also that because of the security built into both web sites, a customer care representative could easily spot false labels that have not propagated through the certified photograph protocol. Hence, a customer care agent could spot a fake or dubious watermark and crop or cut that indicator from the photograph.] Once the photographs are properly identified as certified, other on-line community members can view the shots and make selections based on this information. This is illustrated by step 116.

In other scenarios, a given label (or watermark) may be used for organizational purposes (e.g. in database storage applications). For example, certain profiles may be tagged (in a database) to reflect that specific individuals have a certified photograph and, therefore, they will receive a designated watermark. Hence, on a larger scale, a simple indicator could be provided in a profile to signify that a user has, indeed, taken a certified photograph. This indication could easily be leveraged by backend databases in searches or in queries from other users in the on-line community. Thus, in other embodiments, the label is far more generic and can be used for broad categorization purposes.

Operators or management associated with central web site 18 may designate certain expiration periods for the certified pictures. For example, the certification of a picture may expire two years after the picture was taken. In such an example, a given end user could be instructed to return to photograph web site 20 after two years and schedule another photo session.

General advantages of the certification process are significant and salient. First, a given end user is depicted accurately on a web site, where appearance is a critical factor in their potential interaction with other members of the on-line community. This benefit is symbiotic in that the audience and the individual benefit by displaying an accurate portrayal of a particular end user. Second, the end user is provided with a high-quality professional photograph that can only enhance their success on the web site. Third, by offering such a photograph, numerous undesirable characteristics associated with amateur photography (e.g. blurred pictures, red-eye issues, lack of emphasis on the end user [i.e. in large group shots], etc.) are effectively avoided. Moreover, the certification moniker is valuable because it informs others of the authenticity of the photograph. The certification can also indicate the date when the photograph was taken.

Note that for web sites that include photographs as part of a profile (and where photographs are instrumental in seeking a potential match), most end users prefer searching using a criteria that mandates photographs be provided. The tendered architecture can be configured to have the searching criteria be inclusive of certified photographs. This would allow a given end user to receive more responses as a result of their enhanced profile, which would now include the certified photograph.

Yet another advantage of the present invention relates to cost-cutting measures. Consider a situation in which a company employed a customer care group that was assigned the task of approving photos or validating images. Such an optimization, as outlined herein, could yield considerable savings for that company. By using an automated process (e.g. logging into a secure web site, coordinating with an approved photographer who can easily download an accurate photograph to a given web site, automatically tagging a photograph), the customer care process is avoided entirely (i.e. customer care personnel who are performing these tasks in the field are no longer required). For the consumer, this offers a time savings benefit, as customer care groups can be lethargic in their operations. From a business standpoint, the software can militate an effective optimization for all parties involved.

FIGS. 2A-4F illustrate example screen shots that may be provided in the certified photograph process and which may be used for purposes of discussion. It is imperative to note that these illustrations are only being provided to further outline a particular implementation of the present invention. In no way should these diagrams be used to limit or to restrict the broad teachings of the present invention. Such information has been offered earnestly and, thus, should not be construed to confine the broad applications of the present invention.

Figure 2A:
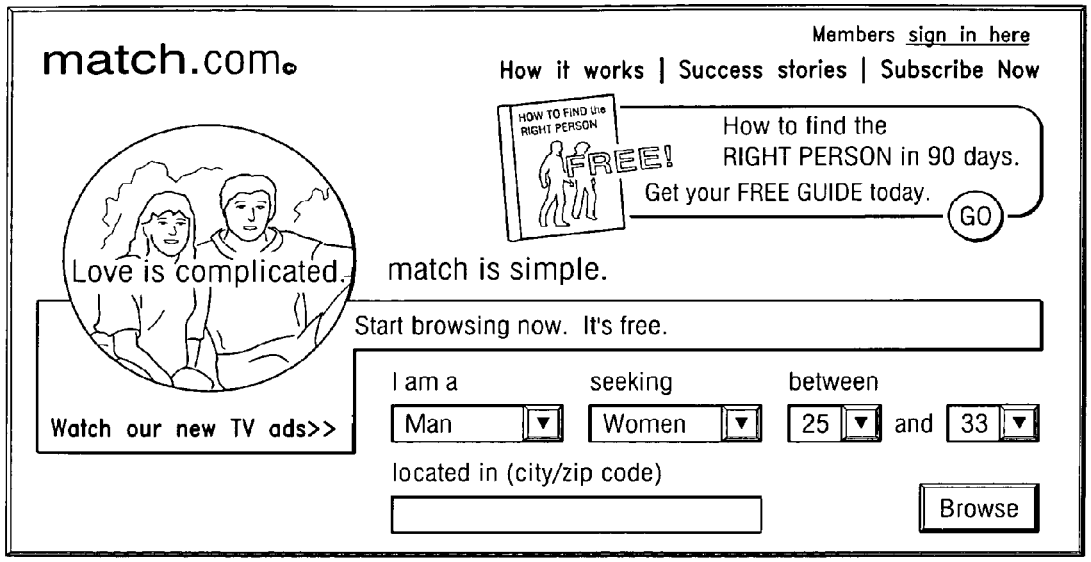
Figure 2B:
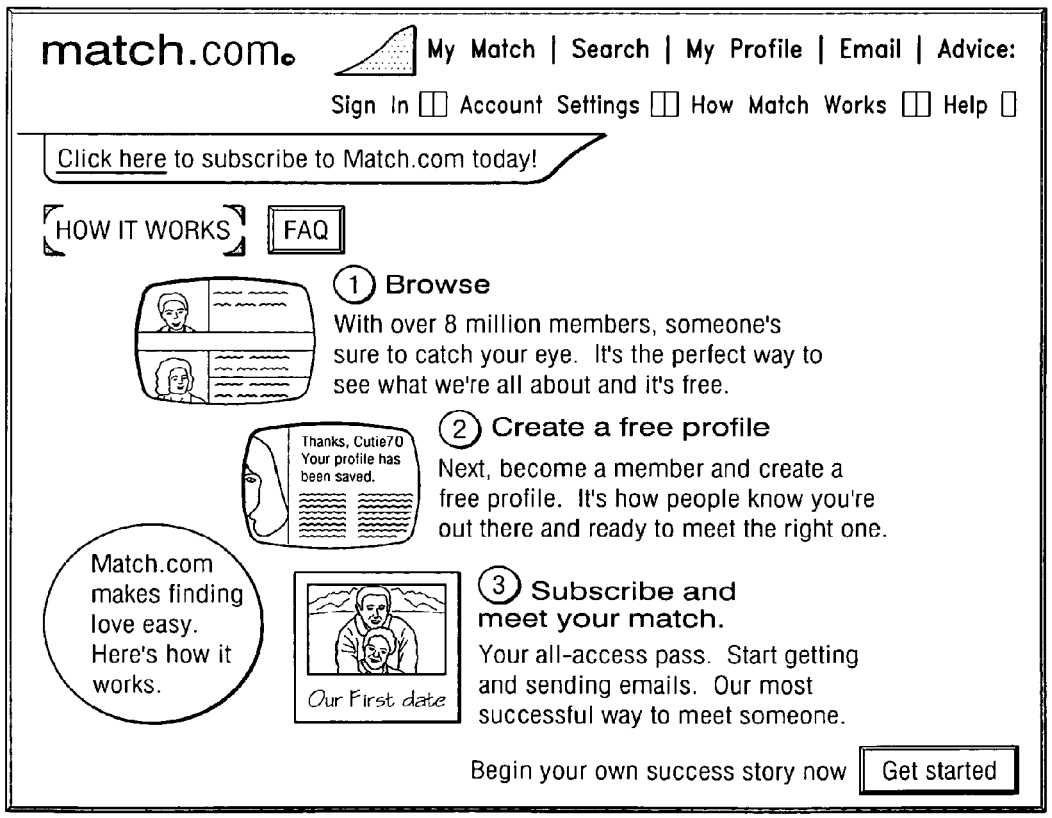
Figure 2C:
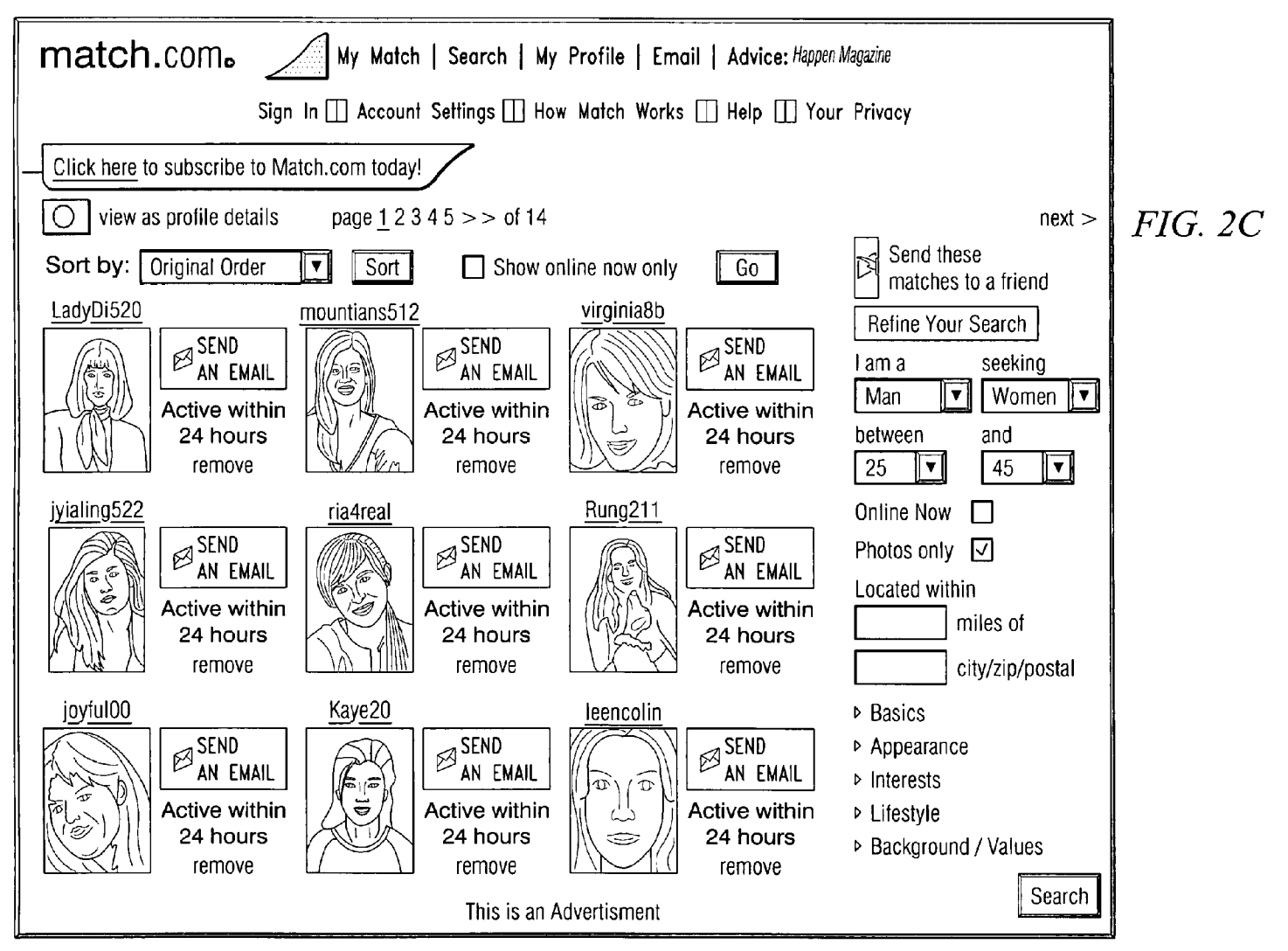
Figure 2D:

FIG. 2A is an example screen shot of a home page in which an interested end user may begin his/her journey. In this example, the home page offers zip code information, as well as a preliminary election of an age and a gender preference. After clicking on the "How it Works" icon on the home page, the end user is directed to the screen shot of FIG. 2B. FIG. 2B is an example screen shot that outlines (generically) the on-line dating process. At a first step, an end user browses the web site. Now interested in participating, the end user then creates a profile. The third step in the process involves subscribing to the service and then receiving information from others who are part of the on-line community.

FIG. 2C is an example screen shot of a number of profiles. In the context of this shot, an end user may be simply browsing. Once an end user has clicked on a given person in this screen, he is directed to FIG. 2D, where he is solicited to sign up for the subscription such that he can effectively contact his candidate selection. FIG. 2E is an example screen shot of a profile of a given end user. In this instance, her criteria are displayed, as well as other information that may be pertinent to a potential mate. Any suitable items can be provided in such a profile (such as interests, favorite hot spots, favorite things, desire for children, background, etc.). Virtually any information (inclusive of video and audio data) may be provided in such a profile.

Figure 3A:
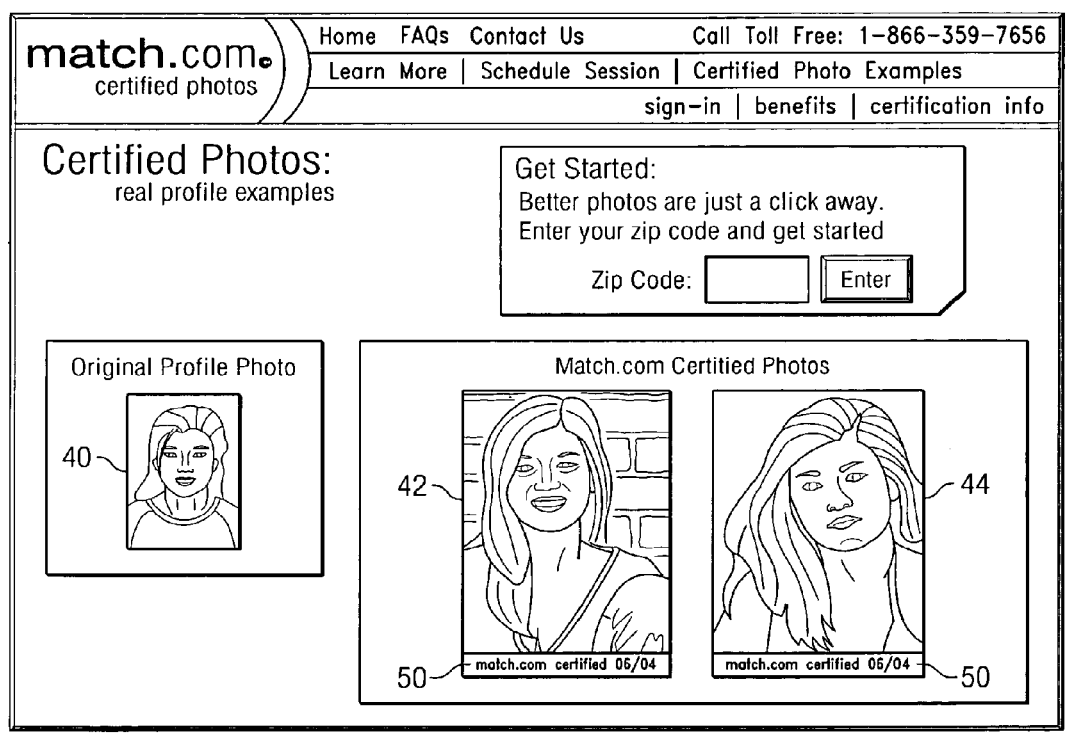

FIG. 3A is an example screen shot associated with photograph web site 20. FIG. 3A offers a quick photograph comparison for the user to consider, whereby the certified photographs are juxtaposed with amateur shots. In these illustrations, an original profile photo 40 is provided, along with two certified pictures 42 and 44 for the prospective buyer to review. Attached to each of photos 42 and 44 are watermarks 50, which indicate that, indeed, these photos have been certified and were taken on June 4. As identified previously, these photos are not permanent, as they do carry an expiration (deemed by an operator of the web site). Also in FIG. 3A is a zip code prompt, which effectively initiates the certified photograph process.

Figure 3B:
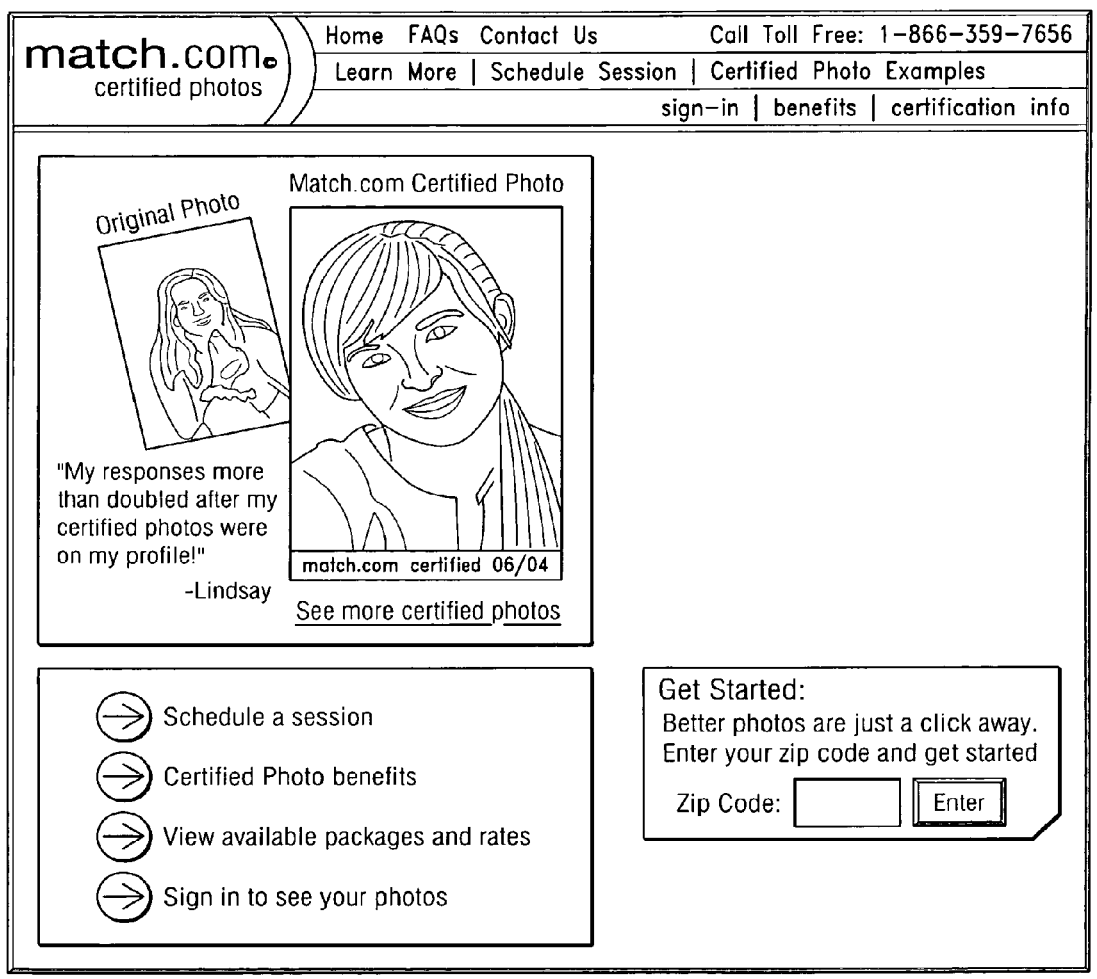
Figure 3D:
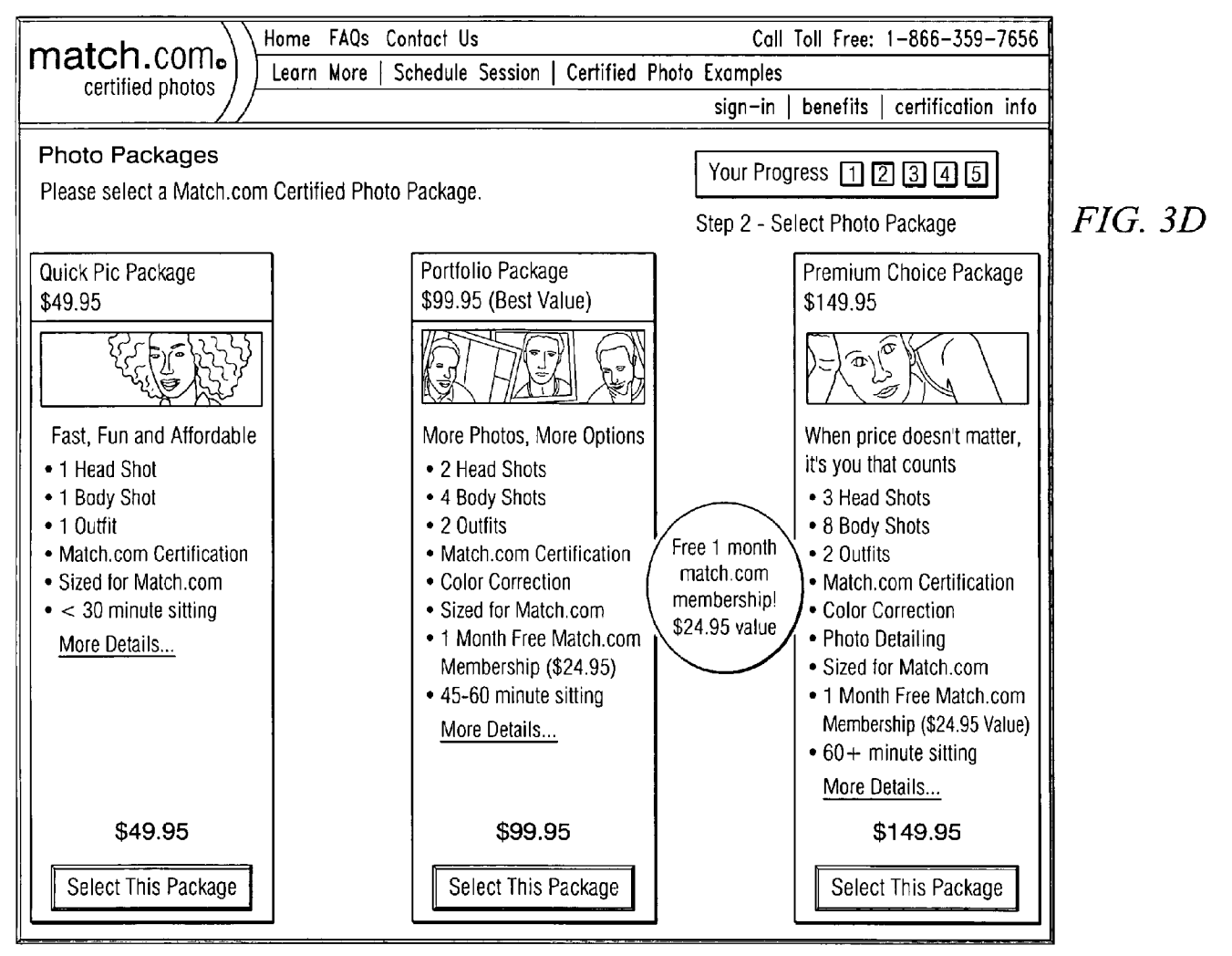

FIG. 3B is an example screen shot of a home page associated with photograph web site 20. From this point, an end user can input his zip code to initiate the procedure. FIG. 3C is an example screen shot of a choice of studio photographer vs. location photographer to be offered to the end user. This represents step 1 of the process, which is being tracked in the upper right hand portion of the screen shot. FIG. 3D is an example screen shot in which a number of packages are offered to the end user, whereby a selection made by the end user directs him to a subsequent screen. This represents step 2 of the process. FIG. 3E is an example screen shot of a scheduling diagram in which the end user can select convenient times for doing the photo session. This represents step 3 of the process, which is highlighted in the upper right portion of the web site.

FIG. 3F is an example screen shot of billing information to be used in processing the photograph order. This represents step 4 in the process. Once the billing information is correctly input into the system, the system processes this information and outputs FIG. 3G, which is an example screen shot indicating the resultant. The resultant here offers the final pricing information, as well as a confirmation of the chosen scheduling. From this point, the end user is ready to attend the photo session.

After the photo session is completed, the end user can return to his/her personal computer and review the proofs from the session. The end user can then elect which photos are to be placed in his/her profile to be seen by other participants in the system. An appropriate label (such as a watermark) can be provided with each photo such that other users are informed of the certification by the controlling web site. These operations are further detailed below with reference to FIGS. 4A-F.

Figure 4A:
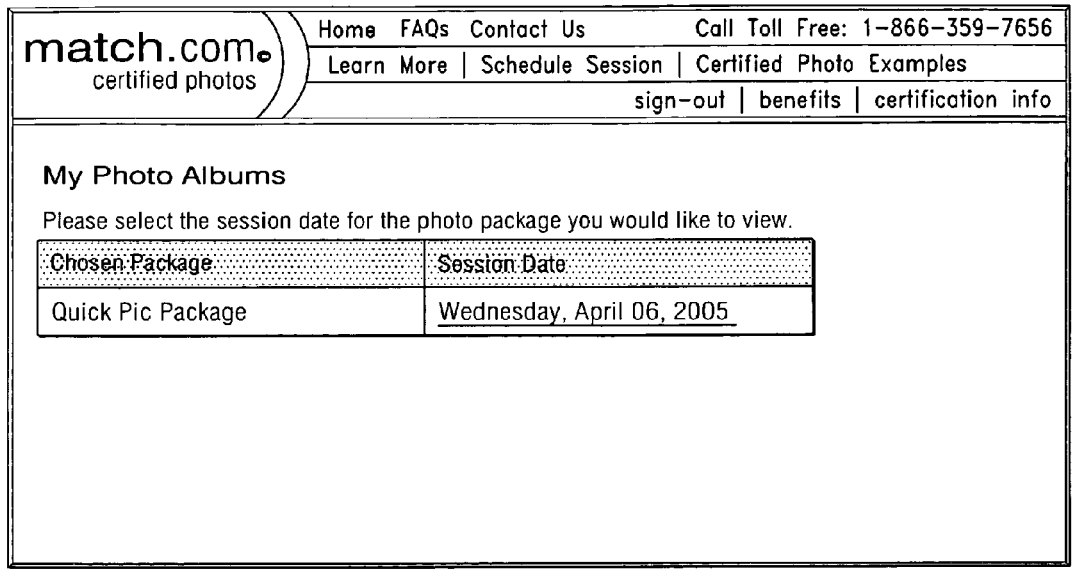
FIG. 4A-F are simplified screen shots involving an example scenario where an end user returns from the photo session and makes his elections for future display.
Figure 4B:
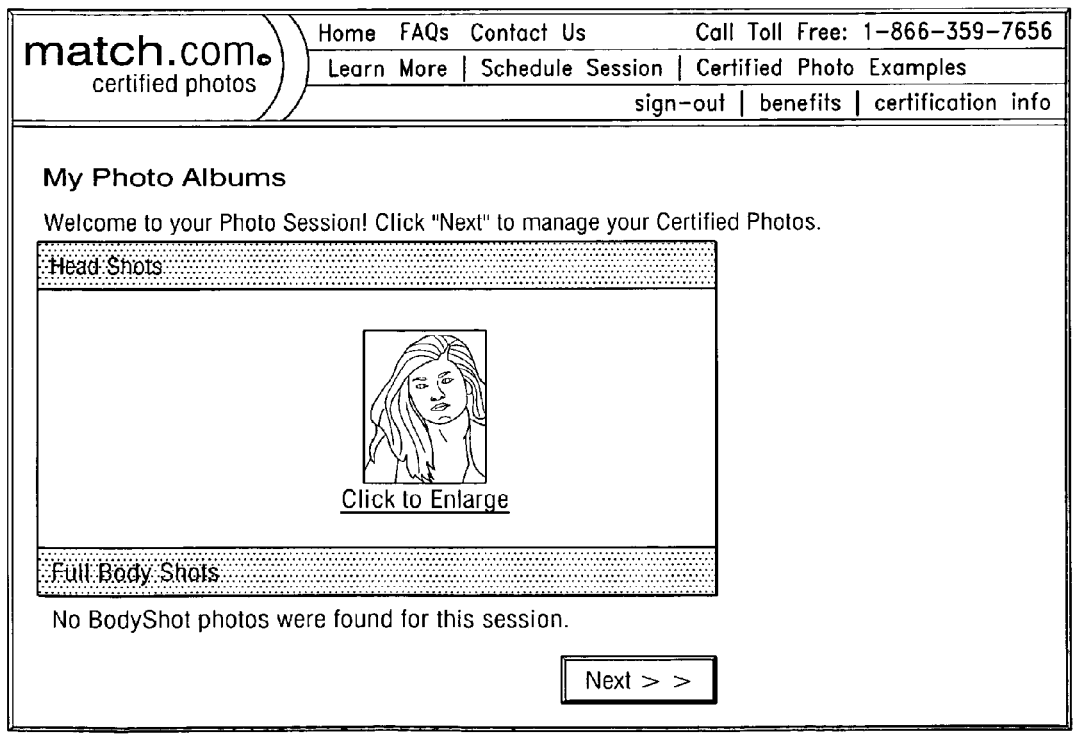

FIGS. 4A-F are simplified screen shots of an example scenario where an end user returns from the photo session and makes her elections to be displayed. In FIG. 4A, an icon is provided that indicates the date and time of the photo session. Clicking on the icon allows the end user to be directed to FIG. 4B, which illustrates head and body shots from the photo session. In this example, only head shots were taken during the photo session.

The end user is also provided with the ability to select primary and secondary shots. In one example, the primary and secondary shots correspond to head shots and to body shots/action shots respectively. For real estate applications, a primary shot may be the front of the house, where a secondary shot is the yard or the interior of the house. Virtually any designations could be provided for primary and secondary shots in any given application (e.g. real estate, on-line dating, job applicants, etc.). The designations of primary and secondary shots here are arbitrary and have only been used in order to provide some examples (amongst many) for the audience.

Figure 4C:
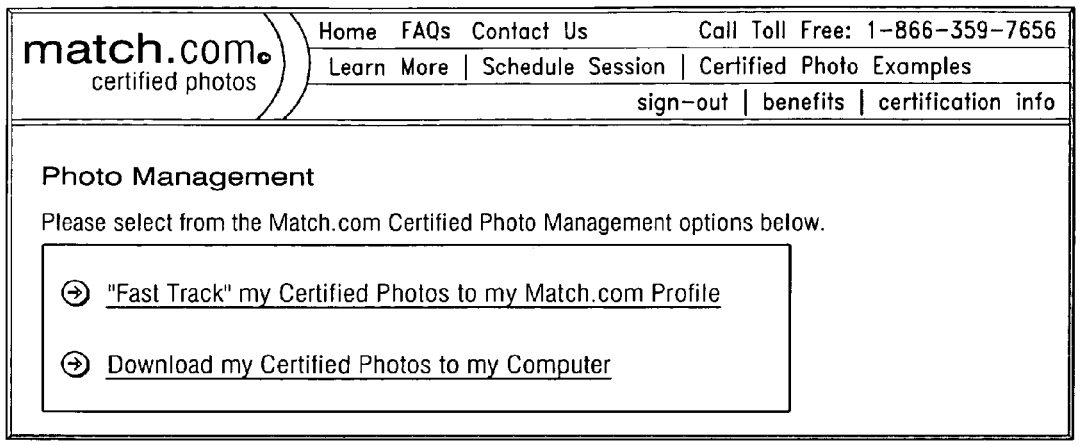
Figure 4D:
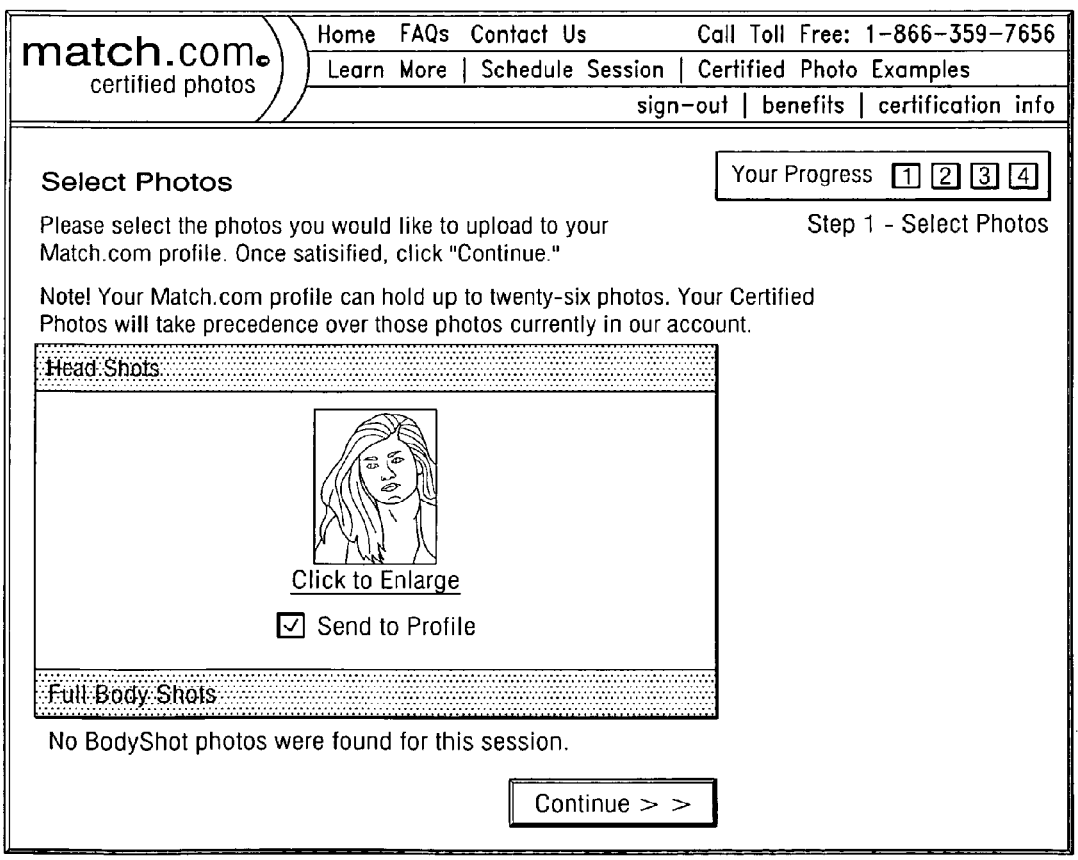

In FIG. 4C, the end user is provided with an option to either fast track her certified photos to her match.com profile (in this on-line dating scenario) or to download her certified photos to her computer. In this case, the end user elects the first choice and is directed to the screen shot of FIG. 4D. In FIG. 4D, the end user checks the box that indicates to send a given set of photos to a given profile. In this case, there is only one shot to send to the file. This operation represents step 1 of a four-step process.

Figure 4E:
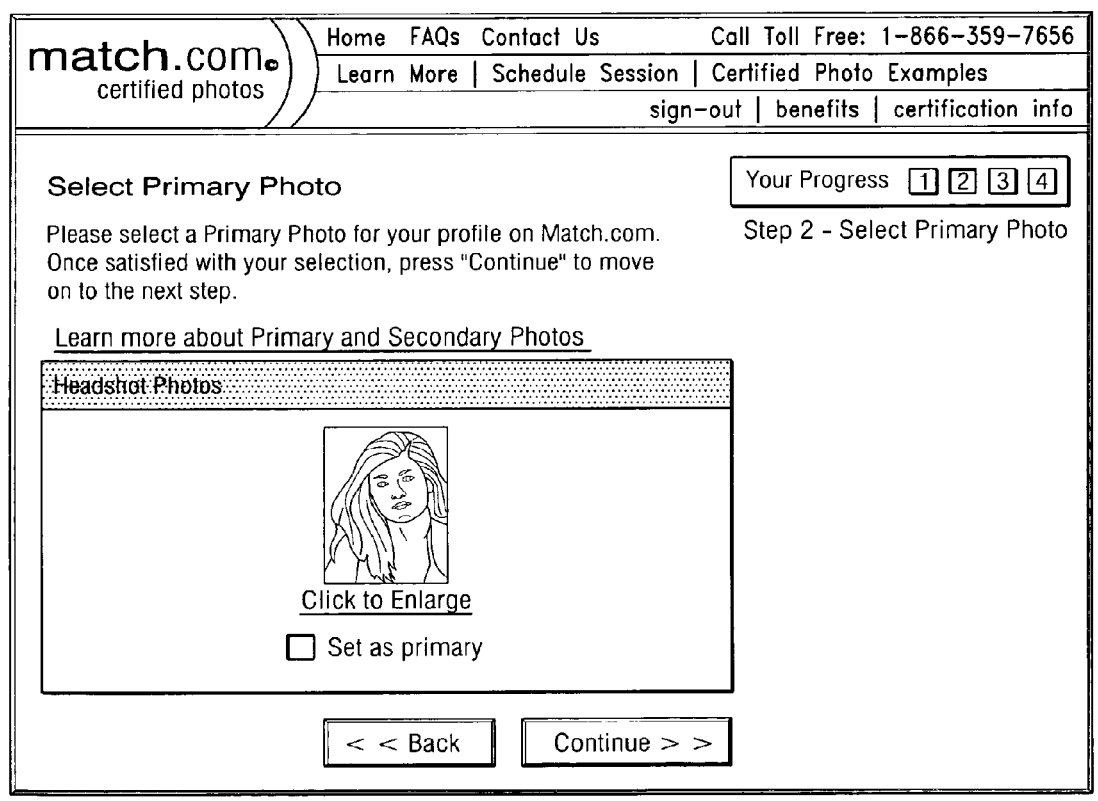
Figure 4F:
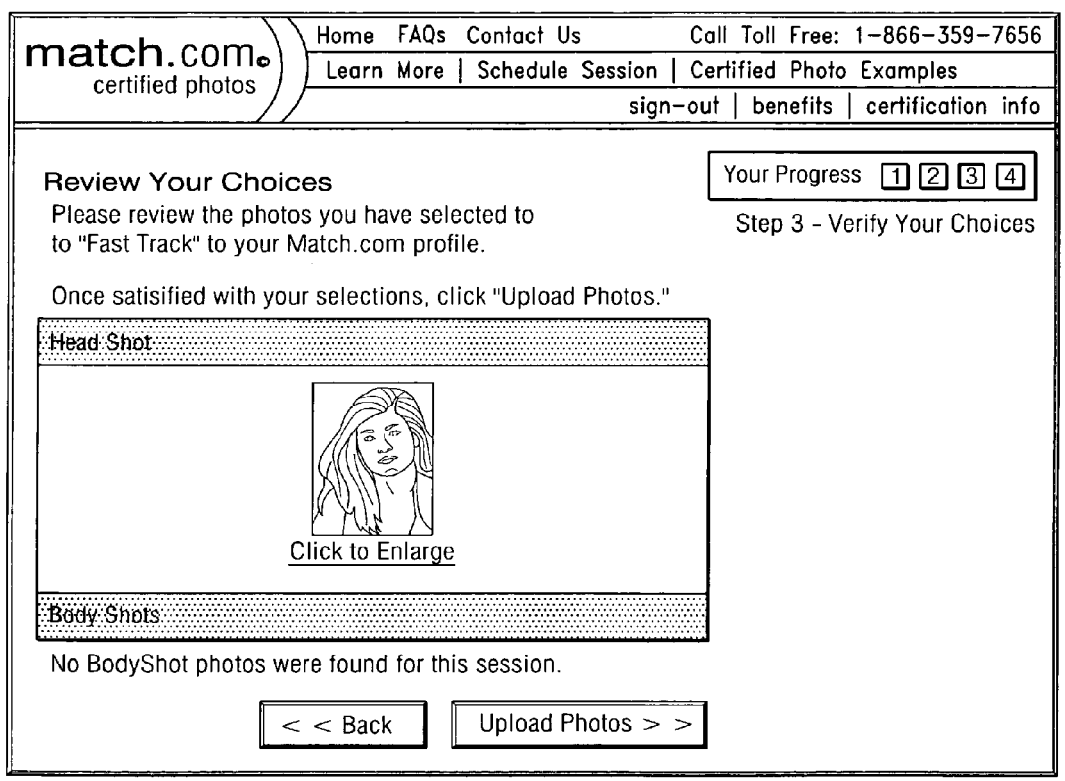

At step 2, which is illustrated by the screen shot of FIG. 4E, the end user is asked to designate one shot (or multiple shots) as primary photographs (for example, to be displayed first or prominently with her profile). FIG. 4F illustrates step 3 of the process, whereby an upload photos icon is provided. The end user may verify the photo choices and, once satisfied with the choices, upload the pictures. Note that the logic of photograph web site 20 is configured such that elections of photographs may force a different migratory path being taken to arrive at central web site 18 (in the case where the photographs are sent to central web site 18). The process is completed at step 4 (not illustrated), where the end user is simply informed that the upload was successful and that this particular process has been finished.

It should also be noted that the certified photograph protocol provides the opportunity for up-sells or ancillary sales. For example, once the end user has navigated through the system, and elected which photographs are to be displayed by the site, the end user may buy additional copies of the photos. Any reprints, copies, reproductions, CDs, electronic media, etc. can also be offered by either or both of the web sites during any point of the above outlined processes.

Some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that the FIGURES illustrate just one of a myriad of potential implementations of system 10.

Although the present invention has been described in detail with reference to particular embodiments, it should be understood that various other changes, substitutions, and alterations may be made hereto without departing from the spirit and scope of the present invention. For example, although the present invention has been described with reference to a dating protocol, any service that deals with (or that leverages) photos could readily benefit from the present invention.

Moreover, although the present invention has been described with reference to a number of elements included within system 10, these elements may be rearranged or positioned in any appropriate manner to accommodate any suitable networking configurations. In addition, any of the elements of FIG. 1A may be provided as separate external components to system 10 or to each other where appropriate.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus, comprising:
  a search component configured to:
    receive a first search request from a particular end user, the first search request including a first option allowing the particular end user to query for one or more end user profiles that include a certified photo, wherein the certified photo is reflective of an accuracy associated with an image of an individual, and
    respond to the first search request by providing the particular end user with the profiles that include a certified photo, and wherein the search component is configured to receive a second search request from the particular end user, the second search request including a second option that allows the particular end user to query for one or more profiles that include and that do not include the certified photo, wherein the certified photo includes a label having indicia signifying an endorsement from an entity for the certified photo.

2. The apparatus of claim 1, wherein the certified photo includes a date associated with when the certified photo was taken, and an expiration date that triggers removal of the label after a given time interval.

3. The apparatus of claim 1, further comprising:
  a server configured to interface with one or more end users and to manage information related to the one or more end users.

4. The apparatus of claim 1, wherein the search component is configured to interface with a server associated with a job seeking service, a person finder service, an athletic service, a real estate service, an academic service, a real estate finding service, or an escort service.

5. The apparatus of claim 1, further comprising:
  a server configured to interface with the search component to provide an on-line dating platform that allows one or more end users to interact.

6. The apparatus of claim 1, wherein an option is provided for one or more end users that allows for uploading selected photographs into respective profiles for the end users.

7. The apparatus of claim 1, wherein the search component is part of a server configured to manage a subscriber service associated with a plurality of end users in a network environment.

8. A method, comprising:
- receiving a first search request from a particular end user, the first search request including a first option allowing the particular end user to query for one or more end user profiles that include a certified photo, wherein the certified photo is reflective of an accuracy associated with an image of an individual;
- responding to the first search request by providing the particular end user with the profiles that include a certified photo; and
- receiving a second search request from the particular end user, the second search request including a second option that allows the particular end user to query for one or more profiles that include and that do not include the certified photo, wherein the certified photo includes a label having indicia signifying an endorsement from an entity for the certified photo.

9. The method of claim 8, wherein the certified photo includes a date associated with when the certified photo was taken, and an expiration date that triggers removal of the label after a given time interval.

10. The method of claim 8, further comprising:
- interfacing with one or more end users via a server; and
- managing information related to the one or more end users.

11. The method of claim 10, wherein the server is associated with a job seeking service, a person finder service, an athletic service, a real estate service, an academic service, a real estate finding service, an on-line dating service, or an escort service.

12. The method of claim 8, further comprising:
- providing an option for one or more end users that allows uploading selected photographs into respective profiles for the end users.

13. The method of claim 8, further comprising:
- managing a subscriber service associated with a plurality of end users in a network environment.

14. Logic encoded in non-transitory media that includes code for execution and when executed by a processor is operable to perform operations comprising:
- receiving a first search request from a particular end user, the first search request including a first option allowing the particular end user to query for one or more end user profiles that include a certified photo, wherein the certified photo is reflective of an accuracy associated with an image of an individual;
- responding to the first search request by providing the particular end user with the profiles that include a certified photo; and
- receiving a second search request from the particular end user, the second search request including a second option that allows the particular end user to query for one or more profiles that include and that do not include the certified photo, wherein the certified photo includes a label having indicia signifying an endorsement from an entity for the certified photo.

15. The logic of claim 14, wherein the certified photo includes a date associated with when the certified photo was taken, and an expiration date that triggers removal of the label after a given time interval.

16. The logic of claim 14, the processor being further operable to perform operations comprising:
- interfacing with one or more end users via a server; and
- managing information related to the one or more end users.

17. The logic of claim 16, wherein the server is associated with a job seeking service, a person finder service, an athletic service, a real estate service, an academic service, a real estate finding service, an on-line dating service, or an escort service.

18. The logic of claim 14, the processor being further operable to perform operations comprising:
- managing a subscriber service associated with a plurality of end users in a network environment.

\* \* \* \* \*